United States Patent
Mongeau et al.

(10) Patent No.: US 8,170,914 B2
(45) Date of Patent: May 1, 2012

(54) INVENTORY CONTROL SYSTEM FOR DIGITAL SIGNAGE NETWORK HAVING A PLURALITY OF SCREEN ZONES ASSOCIATED WITH A PLURALITY OF DISPLAYS

(76) Inventors: Bryan Mongeau, Montreal (CA); Pascal Patry, Montreal (CA)

(*) Notice: Subject to any disclaimer, the term of this patent is extended or adjusted under 35 U.S.C. 154(b) by 671 days.

(21) Appl. No.: 12/267,218

(22) Filed: Nov. 7, 2008

(65) Prior Publication Data
US 2010/0122172 A1    May 13, 2010

(51) Int. Cl.
*G06Q 30/00* (2012.01)
*G06F 3/00* (2006.01)
*G06F 3/048* (2006.01)
*H04N 7/14* (2006.01)
*H04N 5/445* (2011.01)
*G06F 17/00* (2006.01)
*G06F 17/30* (2006.01)
*G06F 12/00* (2006.01)

(52) U.S. Cl. ........ 705/14.43; 705/14.61; 705/14.68; 705/14.69; 725/43; 715/778; 348/14.07; 348/564; 348/565; 707/604; 707/770; 707/827

(58) Field of Classification Search ........ 705/14.43, 705/14.61, 14.68, 14.69; 725/43; 715/778; 348/14.07, 564, 565; 707/604, 770, 827
See application file for complete search history.

(56) References Cited

U.S. PATENT DOCUMENTS

| | | | |
|---|---|---|---|
| 6,177,931 B1* | 1/2001 | Alexander et al. | 725/52 |
| 7,800,694 B2* | 9/2010 | Morris et al. | 348/556 |
| 2003/0101454 A1* | 5/2003 | Ozer et al. | 725/42 |
| 2003/0149601 A1* | 8/2003 | Cabral | 705/5 |
| 2005/0060745 A1* | 3/2005 | Riedl et al. | 725/42 |
| 2009/0172736 A1* | 7/2009 | Tsui et al. | 725/40 |
| 2010/0257553 A1* | 10/2010 | Yuen et al. | 725/36 |

* cited by examiner

*Primary Examiner* — Hoang-Vu A Nguyen-Ba

(57) ABSTRACT

An inventory control system for a digital signage network is provided that uses a denormalized relational database to maintain a record of each of a plurality of screen zones for displays of the network. An inventory column in the database may be used to track scheduling assignments for each day of a calendar year. A screen zone may be given a collective duration limit that prevents assignment of media content items to that screen zone if the assignment would cause the limit to be exceeded for any of the days in the scheduling request. A screen zone may also be designated as overbookable to allow a scheduling assignment even if the limit is exceeded, or may be designated as partially bookable to allow the assignment of media content items for only those days specified in the request for which the limit would not be exceeded.

17 Claims, 2 Drawing Sheets

INVENTORY CONTROL SYSTEM FOR DIGITAL SIGNAGE NETWORK HAVING A PLURALITY OF SCREEN ZONES ASSOCIATED WITH A PLURALITY OF DISPLAYS

FIELD OF THE INVENTION

This invention relates generally to the field of digital signage and, more specifically, to the control of advertising media inventory for a digital signage network.

BACKGROUND OF THE INVENTION

The display of advertising using digital signage is a rapidly advancing field that is significantly enhancing options for delivering advertising content to potential customers. As the use of digital signage has expanded, this content is increasingly delivered over digital signage networks that are connected to hundreds, or even thousands, of individual displays. As each of the displays in a network typically has its own characteristics with regard to location, viewer demographics, and a host of other variables, each benefits from a uniquely tailored selection of media content and display times and schedules. Moreover, within each display there may be multiple screen frames, each of which is independently addressable. As such, there may be different content being displayed in each of a plurality of frames that, as subsets of the displays themselves, make up the destinations for the media content distributed via the network.

Coordination of media content distribution throughout a digital signage network may make use of locally driven loops of content, each specific to a frame or group of frames of one or more displays. In such an arrangement, the media content itself may be retrieved from a centralized storage location over a public or private data network. With the content being categorized according to a number of different criteria, a local device driving one or more displays may assemble a loop of content appropriate to its own characteristics, retrieving the individual media assets via the network. The loop is thus constructed at a local level to suit the various needs of the particular display venue in question. However, with such a highly individualized distribution of media content, tracking and optimizing the available advertising space inventory is a highly challenging task.

SUMMARY OF THE INVENTION

In accordance with the present invention, an inventory control system is provided that controls the inventory of media content items for a digital signage network. Such a network may include a plurality of target screen zones associated with a plurality of displays connected to the network, each screen zone displaying at least one item of media content during a predetermined period of time. The system makes use of a relational database that maintains a record of the display schedule of each of the screen zones. The schedule for each of the screen zones covers a plurality of scheduling units, such as days, which encompass the predetermined time periods during which media content items assigned to the schedule are displayed. The media content items may be displayed sequentially, and repeated in a loop during the predetermined time period. The system uses a scheduler to handle a scheduling request, the scheduler assigning media content items to specific screen zones to be displayed during specific time periods, and updating the record of the display schedule to reflect corresponding changes therein.

The use of scheduling units reflects the fact that a screen zone may be active for a predetermined period of time that is less than the scheduling unit. Multiple screen zones may use the same region of a display provided the respective times during which they are active do not overlap. The media content items may be assigned by the scheduler to a screen zone for one or more of the scheduling units and, therefore, for one or more of the predetermined time periods. For example, the scheduler may assign a particular media content item to a screen zone for a specific set of days out of a calendar year. The database used for maintaining the record of the display schedule may be a denormalized relational database, and may include an inventory column that comprises an array for each one of the screen zones. Each value in an array can be used to represent the collective duration of the media content items assigned to the screen zone in question for a particular scheduling unit. Thus, for example, each value in an array for a particular screen zone might correspond to one day of the calendar year, each value equaling the collective duration of media items scheduled to be displayed in a loop for that screen zone on that day. Thus, the scheduling units (e.g., days) for a particular screen zone may be directly associated to the values of the array indicative of the total duration of media content items scheduled for those days.

The system may also include a user-definable limit for the collective duration of all of the media content items assigned to a scheduling unit for a particular screen zone. This may correspond to the maximum desired loop length for a loop of media content items that is displayed on a particular screen zone during the predetermined time period for the scheduling unit (e.g., day) in question. For example, a loop policy for a particular screen zone may specify that the total loop length may not exceed 330 seconds for a loop playing on a given day. If a scheduling request included the assignment of a media content item to that screen zone for a day that would cause the loop duration limit to be exceeded, the scheduler would be prevented from executing that scheduling request. However, it may also be possible to designate a particular screen zone as overbookable, to indicate that the user-definable limit for that screen zone may be exceeded. Thus, in such a case, a scheduling request may be executed even if it results in the duration limit for one or more of the screen zones being exceeded.

In one embodiment of the invention, a screen zone may also be designated as partially bookable. If the assignment of media content items specified in a scheduling request would cause the collective duration of all the media content items for one of the scheduling units in the scheduling request to exceed the user-definable limit for that scheduling unit, but the assignment would not cause the collective duration of all the media content items for another of the scheduling units in the scheduling request to exceed the user-definable limit, the scheduling request may be partially executed. This partial booking is such that the scheduling request is executed by the scheduler for only those scheduling units for which the user definable limit would not be exceeded.

For a screen zone designated as partially bookable, prior to execution of the scheduling request, the scheduler may apply a bit mask during execution of the scheduling request for that screen zone. The bit mask masks each of the values that corresponds to one of the scheduling units for which execution of the scheduling request would exceed the user-definable limit for that scheduling unit. Thus, assignment of media content items to the masked scheduling units is prevented. For example, if the scheduling request is for five of the scheduling units (e.g., days) in the inventory array for the screen zone in question, and the first one of those scheduling units has an inventory array value and a duration limit that would prevent execution of the request for that scheduling unit, the scheduler can still execute the request for other scheduling units if the screen zone is designated as partially bookable. In such a case, a bit mask is applied during execution of the scheduling request that causes the first of the specified time periods of the request to be excluded from the assignment of media content items.

DETAILED DESCRIPTION

Figure 1:
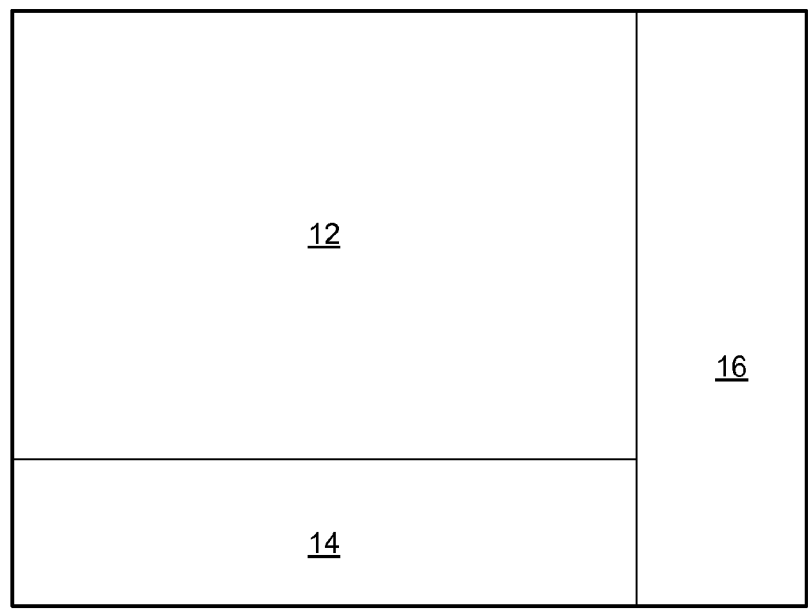
FIG. 1 is a schematic view of a display screen having several screen zones that may be used with a digital signage network according to the present invention.

The presentation of media on a digital signage display may take a variety of different forms. However, it is not uncommon to have several independent screen zones, or frames, on a display screen, each of which shows different content simultaneously. FIG. 1 shows an example of a digital signage display 10 such as might be located in a public venue. In this example, three separate frames each display different content, a first frame 12 displaying a larger video image, a second frame 14 displaying a series of static images, such as a local weather report and third frame 16 displaying a different series of static images, such as a stock market "ticker." In any frame, at any point in time, the content may include still or video advertising images, or other content of interest.

Those skilled in the art will understand that the content arrangement of FIG. 1 is just by way of example, and that different numbers or orientations of frames may be used to display any desired available content. Moreover, the number and orientation of frames may change at different times according to a desired implementation of the display. Thus, reference herein to a "screen zone" is not limited to a static, predetermined region of a display screen. A screen zone may be limited both spatially and temporally, such that multiple screen zones may make use of the same pixels of a display, provided those screen zones do not overlap in time. In this manner, a display screen may be reconfigured at different times (e.g., during different parts of a day) to present different screen zones to different potential viewers.

Figure 2:
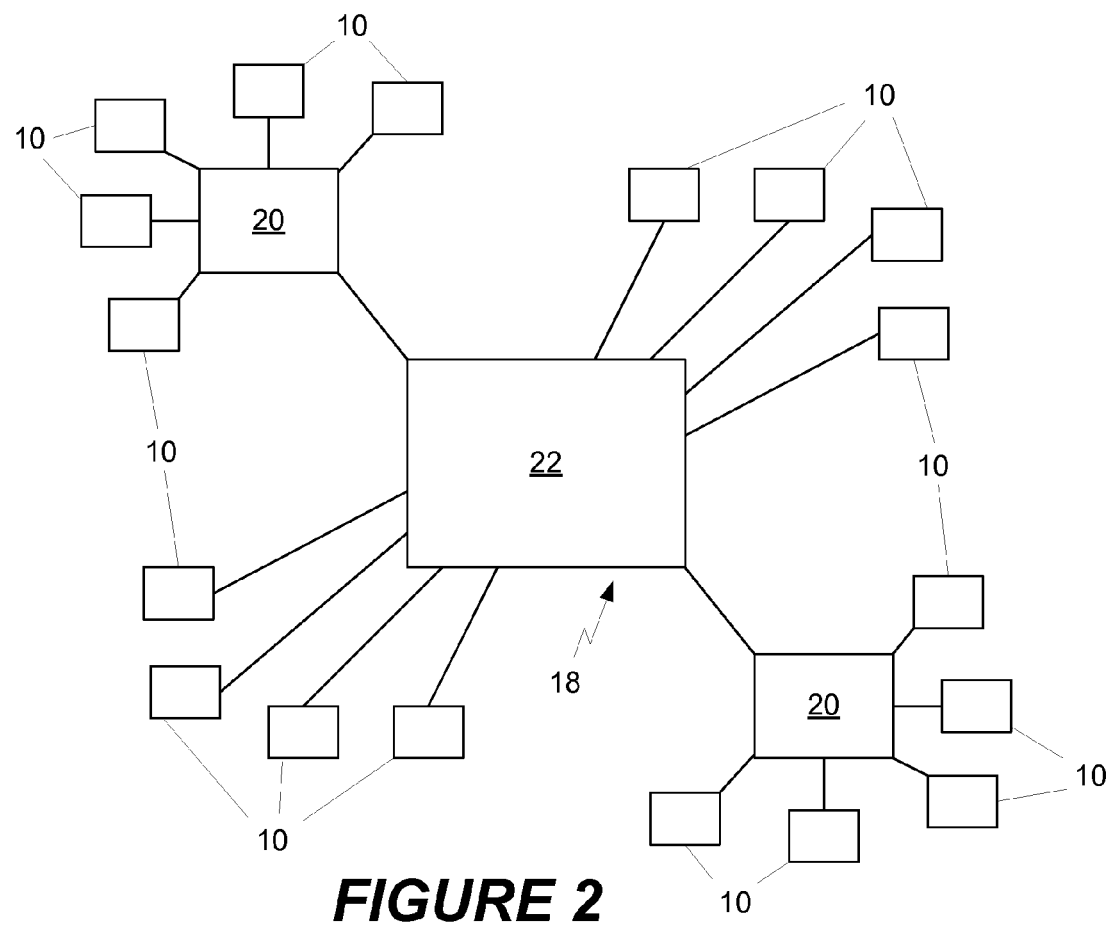
FIG. 2 is a schematic view of a digital signage network that may use the inventory control system of the present invention.

The display 10 may be one of a plurality of displays of a digital signage network such as network 18 depicted graphically in FIG. 2. Each of the displays of the network receives an input from a local display driver that may be, for example, a computer with appropriate programming. Such a display driver may also be used to drive multiple displays. The general concept of using a computer to drive a display screen is well known in the art and, for clarity, the drivers are therefore not shown in FIG. 2. The displays 10 shown in FIG. 2 will be understood to be a combination of a display screen and an appropriate driver, some of which might be shared by multiple display screens. Each of the displays 10 is also linked to the digital signage network and, as shown in the figure, may be connected via local servers 20 that connect to a central database 22 and provide service to one or more of the displays 10. In this manner, advertising media assets may be located collectively in the central database 22, and may be accessed individually by the displays for constructing local display loops each associated with a different screen zone of a display for a given time period.

In a digital signage network, each screen zone represents an advertising space that may be purchased, for a given time, by an advertiser. While the manner of displaying media content is highly flexible, a typical display screen, such as that shown in FIG. 1, might display a different loop of content within each screen zone for a certain period of time. Thus, one typical format allows an advertiser to purchase a segment within a loop that plays in a screen zone of the display for a given time period. The loop has a fixed duration and repeats continuously so that, over a given time period during which it is active, there will be a certain number of repetitions of an advertisement scheduled during the purchased segment. Given the number and variety of segments per loop, frames per display and displays per network, those skilled in the art will recognize the complexity of managing advertising space inventory.

A screen zone, and therefore a loops of content that plays in that screen zone, may be active only during certain times, and the organization of screen zones, such as that shown in FIG. 2, may be changed regularly to provide different display configurations. Thus, the playing of a loop of content may be limited both spatially and temporally, and a single display may host many different content loops. A screen zone, when it is bounded both spatially and temporally in this way, represents a single piece of display "real estate" that may be purchased by a potential advertiser. These "bookable" spaces are referred to herein as "skins."

The loop for each skin is constructed using a loop policy, which dictates the rules of the loop for that skin. For example, the loop policy could be used to set the overall loop length, as well as how advertising segments are organized on the loop. In the present embodiment, the loop policy also includes a rule regarding whether or not a loop is "overbookable." For a loop that is overbookable, the total duration of advertisements that are assigned to a loop may exceed the total loop length. If a loop policy dictates that the loop is not overbookable, the system will prevent a new segment from being assigned to the loop if the addition of that segment would cause the total loop length to exceed the length defined by the loop policy.

In an exemplary embodiment of the invention, the inventory space in a digital signage network is tracked and optimized using a denormalized relational database. In this embodiment, advertisements, or other media content items, are assigned to skins relative to particular days. That is, a calendar day is used as the scheduling unit, such that each skin runs a loop that may change each day. Those skilled in the art will understand that a loop may run for less than an entire day, and that the scheduling unit of one day simply provides a standard division of time for assigning media content items to a skin. Thus, each skin in the network is assigned a unique identity, and the reserved ad space is tracked per skin, per day. This prevents overbooking scenarios while retaining acceptable performance characteristics. Table I shows an example of a "year inventory table" that is used in the present embodiment.

TABLE 1

| Column | Type | Modifiers |
|---|---|---|
| id | bigint | notnull |
| skin_id | bigint | notnull |
| domain_id | bigint | notnull |
| not_modified_since | timestamp without time zone | |
| year | integer | notnull |
| inventory | integer[ ] | |

In this table, the data column labeled "id" is a primary key that uniquely identifies each "year_inventory" row. "skin_id" contains unique identifiers for each skin. The column "domain_id" identifies a client's "domain" in which the skin resides. A domain in this context refers to the group of skins controlled by a particular client. In the present embodiment of the invention, the database is capable of supporting multiple network operators, each of which controls a particular group of displays and, therefore, a particular group of skins. Since the same central database may be used for more than one client, the column "domain_id" is therefore used to associate a skin with a client. The "not_modified_since" column contains timestamps indicative of when the last modification a row took place. When functioning as a client/server application, this column provides information to client-side caching mechanisms that allows those mechanisms to update only the changed delta rows of the table, rather than all of the rows. The column "year" contains information regarding the year for which statistics are being recorded.

It is in the column "inventory" where the denormalization takes place. This column holds a set of arrays each having 366 integers, wherein each integer represents the sum total of reserved time, in milliseconds, for a skin for a given day. An example of an inventory column for a hypothetical skin (e.g. skin_id=1234) might have five minutes worth of segments reserved on January 1, seven minutes reserved on January 2, and no other reservations for the rest of the year. In such a case, the inventory array would appear as [300000, 420000, 0, 0, 0 . . . , 0], where the 363 array values after the first two are all equal to zero, indicating that there are only reservations for the first two days of the year. The first value equals 300,000 to indicate 300 seconds reserved for January 1, and the second value equals 420,000 to indicate 420 seconds reserved for January 2. If a thirty second campaign is then reserved for this skin for each of the dates January 1 through January 4, the inventory array would be updated to [330000, 450000, 30000, 30000, 0, 0, 0 . . . , 0], where each of the 362 array values after the first four are equal to zero.

As mentioned above, the database is denormalized in the sense that the inventory column in the year inventory table is a set of arrays, each of which inherently incorporates data dependent on date. A normalized structure might, instead, track inventory per skin, per day in tuple consisting of (skin_id, date, inventory_total). However, this structure does not scale well because of the high volume of table rows and extremely high number of input/output operations associated with reading and writing to all of the rows. For example, a network with 10,000 displays each with four skins may be tracked using the denormalized structure discussed above such that a year's worth of inventory data can be held in only 40,000 rows. In contrast, using the normalized structure, the data storage would require 14,600,000 rows. Querying and updating this many rows would significantly reduce the performance characteristics of the system.

In addition to reducing the number of rows in the year inventory table, the denormalized structure of the present invention reduces the "on-disk" size of each row to about two kilobytes of data. As such, the usage of the relational database management system's table caching layer is reduced to the point that the entire dataset, about eighty megabytes, can be held in RAM memory. Moreover, with the denormalized structure, index growth is significantly reduced. With a normalized structure, one would need to maintain indexes on both the "skin_id" and "date" entries in order to get rapid access to the correct rows. However, the size of these indexes would be extremely large, and would compound the I/O problem created by querying and updating millions of rows at a time.

The present invention also provides an inventory tracking system with the capability to do "partial booking," which enables a reservation to be active only on certain days on certain skins. Partial booking is a convenient feature in that addresses the problem of "remnant space," in which gaps in the schedule of certain loops on certain days cannot be perfectly matched to a reservation. In the present embodiment, the relationship that governs this situation is called a "skin_slot", and it is the association between campaigns and screen zones. It is represented herein by following the structure of Table 2, which is referred to as "public.skin_slot."

TABLE 2

| Column | Type | Modifiers |
|---|---|---|
| id | numeric | notnull |
| skin_id | numeric | notnull |
| active | numeric | notnull |
| not_modified_since | timestamp without time zone | |
| slot_id | numeric | |
| day_mask | integer[ ] | |

In this table, "skin_id" uniquely identifies a particular skin. The column "slot_id" links to a particular advertising campaign, i.e., to a particular advertising segment, or other media content item, to be booked to that skin.

In this embodiment, the element "day_mask" is another denormalized structure. In particular, it is a bit mask in which each active day is represented by a bit in an integer. As an example, hypothetical skin_id 1234 may again be considered to have an inventory array of [330000, 450000, 30000, 30000, 0, 0, 0 . . . , 0]. In this example, a user wishes to book a campaign that consists of a forty-five second segment that runs in the loop of the skin in question for the period of January 1 to January 4, but the loop policy for the skin states that a maximum length of the loop is eight minutes. If the loop policy also states that the loop is not overbookable, the reservation cannot be booked because the extra 45 seconds would exceed the loop limit for January 2. However, if the loop is partially bookable, the other days can accommodate a "partial booking."

To make the partial booking, the "day_mask" bit mask of the "skin_slot" table is used to control which of the days in the campaign will be booked. The bits of the bit mask correspond to the days of a month, with the least significant bit corresponding to the first day of the month in question. Limiting the example to a thirty-two digit bit mask, for which the first bit is a sign bit and is therefore not used as part of the mask, the appropriate mask for this partial booking would be:

00000000 00000000 00000000 00001101=13

As can be seen, the mask functions as on/off flags for the days, and correctly suppresses the booking of the campaign on January 2nd due to the "0" in the relevant position in the bit mask, while enabling the booking for each of January 1, January 3 and January 4. The other digits of the mask are also "0" as they are outside the scope of the campaign period. With a sign bit equal to zero, the resulting decimal corresponding to this bit mask is 13. The length of the bit mask being thirty-one places (with a sign bit) enables it to cover all of the days for a month's period. If a campaign is to span multiple months, the bit mask may be represented as an array of multiple integers.

When a client wishes to book a new campaign, a start date and an end date are specified, and a group of skins are identified for that campaign. The particular group of selected skins are chosen based on any of a number of different factors, such as time of day, geographic location, likely demographics of viewers, etc. The selection process is outside the scope of this invention, and may be partially or fully automated. Once the desired group of skins is identified, the system attempts to book the campaign to each of the skins for the desired dates. For the skins that have a loop policy that indicates that they are overbookable, the campaign is reserved to those skins for each of the desired dates, and their inventory is updated accordingly. For each skin that has a loop policy that indicates that it is not overbookable, the attempted booking is completed if sufficient inventory (i.e., loop time) exists for that skin for each of the desired dates of the campaign. However, if there is insufficient loop time available for any of the dates, the booking fails for that skin for all of the specified dates. Finally, for each skin having a loop policy that indicates that it is partially bookable, a day mask is used to limit the booking to just those days of the campaign for which sufficient loop time is available.

The system regularly updates the contents of the inventory column for the year inventory table. When an attempt is made to book a new campaign, the public skin slot table is updated to create an association between the campaign and skins that are designated. For each partially bookable skin, a day mask that is created for this association indicates the days for which the campaign is booked to that skin. Each value of the day mask is set according to whether or not enough time remains for the skin in question to allow booking of the campaign. That is, if the sum of the current day inventory for that skin and the additional time required for the campaign being booked is less than or equal to the loop length set for that skin, then the value of the day mask corresponding to that day is set to "1". If the sum exceeds the indicated loop length, then that value of the day mask corresponding to that day is set to "0".

In preparing a list of media files for a partially bookable skin for a given date, whether or not a media file of a particular campaign is assigned to that skin depends on the value of the day mask for that date. First, the system compares the current system date with the campaign dates to confirm that the campaign is intended to run on the current day. This result may take the form of a "current day bit mask" that simply indicates whether the current date is one of the dates specified by the campaign. The system may then perform a bitwise "AND" between the current day bit mask and the day mask of the skin to determine whether or not to add the media file to the set of files assigned to the skin on that day. If the value of the current day bit mask is "1" (indicating that the current date matches one of the campaign dates) and the value of the day mask of the skin is "1" (indicating that there is sufficient time left in the inventory to book the campaign for the current day), the media file is added to the current day's list of media files used to construct the loop.

Figure 3:
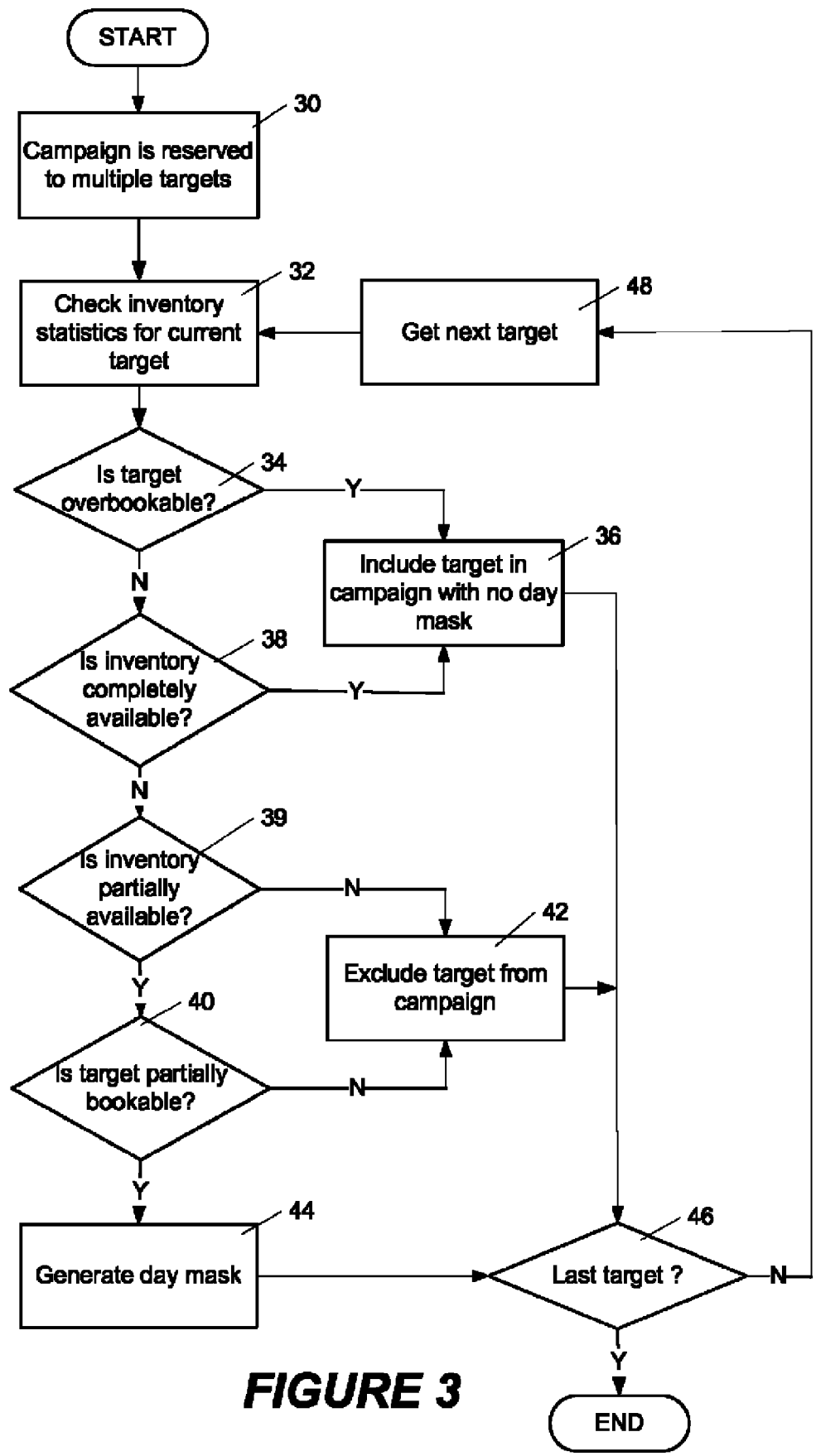
FIG. 3 is a flow diagram demonstrating the process of assigning digital signage inventory with an inventory control system according to an exemplary embodiment of the invention.

FIG. 3 shows a flow diagram of a media inventory control process according to the present invention. Upon receiving a new campaign, the campaign is reserved to multiple targets (i.e., skins) in step 30. In step 32, the inventory statistics are checked for a current target, which is a first target on the list when the process first begins. That is, the system consults the year inventory table for the current target. The system then queries in step 34 as to whether the target is overbookable. If the target is overbookable, the process proceeds to step 36 so that the target is included in the campaign with no day mask, that is, it is booked for each of the days specified in the campaign. The process then checks to see if this is the last target (step 46) and, if not, proceeds to the next target (step 48) before returning to step 32. If the current target is the last target on the list, the process ends.

If a target is not overbookable, the process proceeds from step 34 to step 38, in which the system queries as to whether the inventory required for the campaign is completely available. If so, then the process proceeds to step 36, where the campaign is booked for each of the campaign days. The system thereafter proceeds to step 46, terminating if no targets remain or returning to step 48 to evaluate the next target. If the inventory is not completely available, the process proceeds from step 38 to step 39 to determine whether the inventory is partially available. If not, the target in question is excluded from the campaign in step 42, and the process proceeds to step 46, continuing as described above. If the inventory is partially available for the target in question, it is determined whether the target is partially bookable in step 40. If not, then the target is excluded from the campaign in step 42 and proceeds to step 46 as described above. If the target is partially bookable, then a day bit mask is generated in step 44 where days are included or excluded from the campaign by the bit masking operation depending on whether they have the necessary inventory available. The process then proceeds to step 46, either terminating if the last target has been reached, or returning to step 48 to evaluate the next target. In this way, the process continues until the campaign has been processed for all of the requested targets.

The inventory control system of the foregoing embodiments may be implemented in software, hardware, firmware, or a combination thereof. As mentioned above, the central database 22 (FIG. 2) is used to perform the inventory control operations described herein, as a given campaign may be distributed via any of the different displays 10 in the network. Those skilled in the art will recognize, however, that it would be possible to share some of the tasks between the central database and any local servers 20, if so desired. Moreover, the tasks of managing the network, including the inventory control tasks, could be shared between different linked databases, and the central database 22 is intended to reflect that possibility. Many variations in the spatial and temporal restrictions of the screen zones may also be used without departing from the scope of the present invention.

What is claimed is:

1. An inventory control system for a digital signage network having a plurality of screen zones associated with a plurality of displays connected to the network, each screen zone displaying at least one item of media content for a predetermined period of time, the system comprising:

a database that maintains a record of the display schedule of each of the screen zones, the schedule covering, for each screen zone, said predetermined period of time during which media content items assigned to the schedule are displayed, the database maintaining a table that includes an inventory column comprising an array for a screen zone that contains a series of time values each representing a collective duration of all of the media content items scheduled for a different one of the predetermined time periods for the screen zone in question; the table further comprising for each of the predetermined time periods for the screen zone in question, a user-definable limit for the collective duration of all of the media content items scheduled for that time period, and a scheduler that receives a scheduling request, assigns media content items to specific screen zones to be displayed during said predetermined time periods and updates the record of the display schedule to reflect corresponding changes therein, wherein the scheduler is prevented from executing a scheduling request if the assignment of media content items specified in the request would cause the collective duration of all of the media content items for any of the predetermined time periods specified in the scheduling request to exceed said user-definable limit.

2. An inventory control system according to claim 1 wherein the media content items assigned to a particular screen zone are scheduled to play as a loop which repeats during said predetermined time period.

3. An inventory control system according to claim 2 wherein said predetermined time period is a portion of one temporal scheduling unit, and wherein media content items are assigned by the scheduler to a screen zone by specifying one or more scheduling units each encompassing a different predetermined time period during which assigned media content items will be displayed.

4. An inventory control system according to claim 3 wherein the temporal scheduling unit is one calendar day.

5. An inventory control system according to claim 1 wherein the database is a denormalized relational database.

6. An inventory control system according to claim 1 wherein each of the time values of said array corresponds to the collective duration of media content items scheduled to play during the predetermined time period of a particular temporal scheduling unit for a particular screen zone.

7. An inventory control system according to claim 1 wherein a screen zone may be defined as overbookable to allow the scheduler to assign a media content item to that screen zone even if such an assignment would cause the collective duration of all of the media content items for one of the predetermined time periods specified in the scheduling request to exceed said user-definable limit.

8. An inventory control system according to claim 1 wherein a screen zone may be defined as partially bookable such that, if the assignment of media content items specified in the request would cause the collective duration of all of the media content items for one of the predetermined time periods specified in the scheduling request to exceed said user-definable limit, but said assignment would not cause the collective duration of all the media content items for another of the predetermined time periods in the scheduling request to exceed said user definable limit, the scheduling request is executed by the scheduler for only those predetermined time periods for which the user definable limit would not be exceeded.

9. An inventory control system according to claim 8 wherein, for a screen zone designated as partially bookable, the scheduler applies a bit mask during execution of the scheduling request, the bit mask masking each of the values that corresponds to one of the predetermined time periods for which execution of the scheduling request would exceed the user-definable limit for that predetermined time period, said masking thereby excluding any such predetermined time periods from the execution of the scheduling request.

10. A method for controlling inventory of a digital signage network having a plurality of screen zones associated with a plurality of displays connected to the network, each screen zone displaying at least one item of media content for a predetermined period of time, the method comprising:

maintaining a record of a display schedule of each of the screen zones in a database, the display schedule being connected to each of the plurality of displays through the network, the schedule, for each screen zone, covering a predetermined period of time during which media content items assigned to the schedule are displayed, the database maintaining a table that includes an inventory column comprising an array for a screen zone that contains a series of time values each representing a collective duration of all of the media content items scheduled for a different one of the predetermined time periods for the screen zone in question, the table further comprising for each of the predetermined time periods for the screen zone in question, a user-definable limit for the collective duration of all of the media content items scheduled for that predetermined time period;

receiving at a scheduler a scheduling request;

assigning, by the scheduler, media content items to specific screen zones to be displayed during said predetermined time periods and updating by the scheduler the record of the display schedule in the database to reflect corresponding changes therein;

preventing the scheduler from executing a scheduling request if the assignment of media content items specified in the request would cause the collective duration of all of the media content items for any of the predetermined time periods specified in the scheduling request to exceed said user-definable limit; and providing, from the database, individual access to the media content items to each of the plurality of displays.

11. A method according to claim 10 wherein the media content items assigned to a particular screen zone are scheduled to play as a loop which repeats during said predetermined time period.

12. A method according to claim 11 wherein said predetermined time period is a portion of temporal scheduling unit, and wherein media content items are assigned by the scheduler by specifying one or more scheduling units each encompassing a different predetermined time period during which assigned media content items will be displayed.

13. A method according to claim 10 wherein the database is a denormalized relational database.

14. A method according to claim 10 wherein each of the time values of said array corresponds to the collective duration of media content items scheduled for a particular day for a particular screen zone.

15. A method according to claim 10 further comprising providing an overbookable characteristic that may be assigned to a screen zone by a user to allow the scheduler to assign a media content item to that screen zone even if such an assignment would cause the collective duration of all of the media content items for one of the predetermined time periods specified in the scheduling request to exceed said user-definable limit.

16. A method according to claim 10 further comprising providing a partially bookable characteristic that may be assigned to a screen zone by a user such that, if the assignment of media content items specified in the request would cause the collective duration of all of the media content items for one of the predetermined time periods in the scheduling request to exceed said user-definable limit, but said assignment would not cause the collective duration of all the media content items for another of the predetermined time periods in the scheduling request to exceed said user-definable limit, the scheduling request is executed by the scheduler for only those predetermined time periods for which the user definable limit would not be exceeded.

17. A method according to claim 16 further comprising, for a screen zone designated as partially bookable, applying a bit mask during execution of the scheduling request, the bit mask masking each of the values that corresponds to one of the predetermined time periods for which execution of the scheduling request would exceed the user-definable limit for that time period, said masking thereby excluding any such time periods from the execution of the scheduling request.

* * * * *